F. B. HALL.
Registering Reciprocating and Rotary Motion.
No. 32,133.
Patented April 23, 1861.
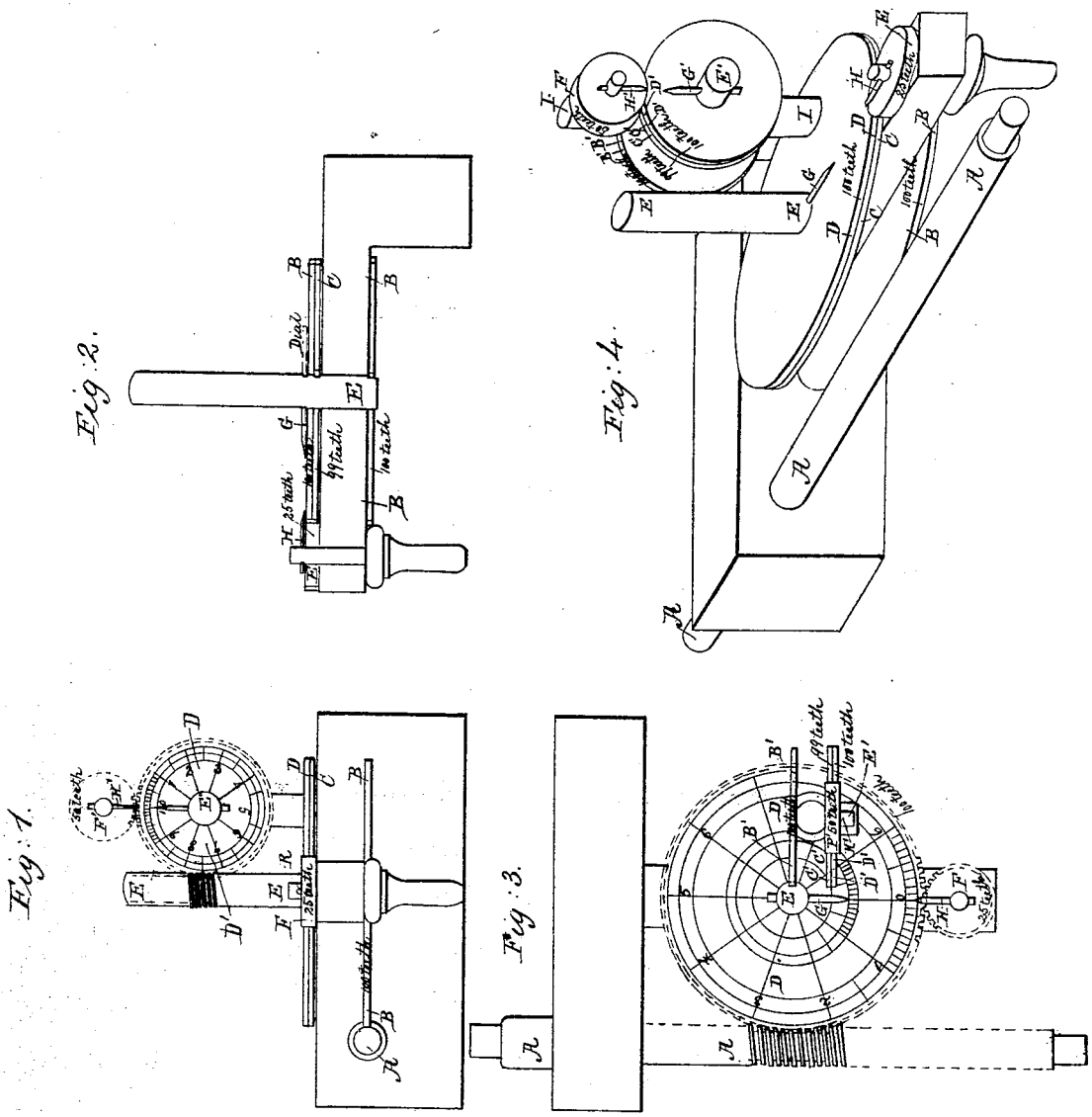

UNITED STATES PATENT OFFICE.

FRANCIS B. HALL, OF HARTFORD, CONNECTICUT.

INSTRUMENT FOR REGISTERING RECIPROCATING AND ROTARY MOTIONS.

Specification of Letters Patent No. 32,133, dated April 23, 1861.

*To all whom it may concern:*

Be it known that I, FRANCIS B. HALL, of the city and county of Hartford and State of Connecticut, have invented a new and useful Machine or Instrument for the Registration of Rotary or Reciprocating Motion, which I term the "peristrommeter," and that the following is a full and exact description of such machine or instrument, reference being had to the accompanying drawings and to the letters and figures of reference thereon.

Figure 1 represents an elevation of the instrument; Fig. 2, a section; Fig. 3, the ground plan; and Fig. 4, a perspective view of the whole machine.

A, A, represents a screw to be connected with and rotated by machinery whose motions are to be registered. The thread of this screw enters the teeth of a wheel B, B, and by the revolutions of which screw the wheel B, B, is caused to revolve together with the axle E, E, upon which it is fixed by key or otherwise. The wheel B, B, bearing one hundred teeth is made to revolve once by one hundred revolutions of the screw A, A.

C, C, is a wheel also fixed upon the axle E, E, by key or otherwise, bearing ninety-nine teeth, and revolves, with B, B, once, by one hundred revolutions of A, A.

D, D, is a wheel of equal diameter with C, C, bearing one hundred teeth, and concentric with the axle E, E, but not affixed to it.

The wheels C, C, and D, D, are placed parallel, and sufficiently near to one another to admit of their teeth entering the teeth of the same pinion F, moving upon a fixed axle, and of sufficient thickness, and bearing teeth suitable, to communicate regular relative motion from the wheel C, C, to the wheel D, D.

G, is a pointer affixed to the axle E, E; and H, a pointer affixed to the fixed axle of the pinion F. The surface of the wheel D, D, is graduated into hundredths. If the pointers G, and H are placed in the same right line then by causing the screw A, A, to revolve once from left to right, the pointer G will make together with the axle E, E, one one-hundredths of a revolution. By causing the screw to revolve twice, the pointer and axle will make two one-hundredths of a revolution; three times, three one-hundredths; and one hundred revolutions of the screw will cause the said pointer and axle to revolve once and return again into the same right line with the fixed pointer H.

The number of the revolutions of the screw A, A, from one to one hundred may therefore be determined by the number of hundredths which intervene on the graduated face, (counting in the direction of the progression of the figures thereon,) between the pointer G, and the fixed pointer H. By revolving the screw one hundred times the wheels B, B, and C, C, with the axle E, E, and pointer G, will be made to revolve once; but the wheel D, D, having one tooth more than C, C, will have made in the same direction ninety nine one-hundredths of a revolution and have changed its relation to the pointer G by one one-hundredth, which will appear by the pointer having relatively advanced upon the graduated face a corresponding one-hundredth. Every one hundred revolutions of the screw A, A, will cause the pointer G to advance relatively to the graduated face one one-hundredth. The revolutions of the screw A, A, from one hundred to ten thousand will therefore be shown by the pointer G, upon the graduated face D, D. When the screw A, A, has revolved ten thousand times the pointer G, will have revolved with relation to the fixed pointer H one hundred times, and with relation to the graduated face D, D, once, *i. e.*, the graduated face will have made 99 revolutions, while the pointer G has revolved 100 times, the graduated face making one revolution less than the pointer G, and consequently one less than the axle E, E, when the screw A, A, has revolved 10,000 times.

Upon the axle E, E, a thread is cut entering the teeth of the wheel B′ B′ affixed to an axle E′, E′, whose bearing is in a standard I, I, fixed to the wheel D, D, perpendicularly to the plane thereof, and adjusted so as to allow motion to be communicated to the wheel B′, B′, bearing 100 teeth by the thread of the screw cut upon the axle E, E. The wheels B′ B′, C′ C′, and D′ D′, and the pinion F′, the axle E′, and the pointers G′ and H′, are, in their relation to one another and the axle E, E, with its thread, a repetition of the system of parts heretofore described, (viz., wheels B B, C C, D D, pinion F, axle E, E, and pointers G, and H, in their relation to the screw A, A,) and will all revolve together, with the wheel D, D to which they are affixed, ninety-nine times while the axle E, E, shall have revolved one hundred times, which, it will readily be perceived, would produce a result corresponding to what would follow were the second system of wheels and parts to remain at rest and the axle E, E to revolve once from right to left, causing thereby the wheel B' B' to make one one-hundredth of a revolution; and, supposing the pointers G' and H' to have been in the same right line, there would now intervene upon the graduated face D' D', between the pointers G' and H' one one-hundredth. The number of revolutions of the screw A A from 10,000 to 1,000,000, will therefore be shown by the number of hundredths intervening between the pointers G' and H' on the graduated face of D', D' counting in the direction of the progression of the figures thereon. The number of the revolutions of the screw A A, from 1,000,000, to 100,000,000, will be shown by the relation of the pointer G' to the graduated face of D' D' which as in the previous case makes 99 revolutions while the pointer G' makes 100.

By extending the axle E' E', and cutting a thread thereon, and mounting a third similar system of wheels and parts in a similar manner on D' D', bearing a like relation to the so-extended axle that the second system bears to E, E, and that the first system bears to A, A, we may extend the recording power of the instrument so as to register 1,000,000,000,000, (1 trillion) revolutions of the screw A A; and by a fourth and fifth and further addition of systems, extend the power of registration indefinitely, each additional system increasing the power of registration by a multiple of ten thousand.

Where a reciprocating motion is to be registered it must be converted into a rotary motion and then communicated to the screw A, A.

For convenience in reading the registration, dials, graduated into one hundredths with the progression of the figures from right to left, may be affixed to the axles E, E, and E', E', and to all additional corresponding axles of successive systems, in place of the pointers G and G', and all additional corresponding pointers of successive systems respectively in their respective planes of revolution; the initial points or zeros on these dials to correspond respectively to the points of G and G, &c. The first of these dials, affixed to E, E we will call "dial 1;" the graduated face of D D we will call "dial 2;" the next dial of the class above described affixed to axle E' E', we will call "dial 3," and the graduated face of D' D' "dial 4" and so on. The revolutions of A A, from 1 to 100 would then be shown by the figure on dial 1 opposite to the fixed pointer H, and the revolutions from 100 to 10,000 would be shown by the figure on dial 2 opposite the initial point of dial 1, and the revolutions from 10,000 to 1,000,000 would be shown by the figure on dial 3 opposite the pointer H'; and the revolutions from 1,000,000 to 100,000,000, by the figure on dial 4 opposite the initial point of dial 3, and so on.

I do not claim the use of a screw in combination with toothed wheels, nor of toothed wheels differing in the number of teeth, in combination with the screw. But

What I claim as my invention and desire to secure by Letters Patent is as follows:

1. The combination of three toothed wheels B, C, and D, with the pinion F (all operated by a worm A, or means equivalent) when so arranged as to indicate the whole number of revolutions, and decimal parts of a revolution, of these respective wheels, by means of the dial upon the face of the wheel D, or on any equivalent surface or surfaces, for the above or equivalent purpose.

2. The combination of three toothed wheels and a pinion (related to each other in the same or equivalent manner as may be the said wheels and pinion mentioned in the above claim) when so arranged relatively to the face of the wheel D, as to be operated by a worm or an axle E, or by means equivalent, for the above or equivalent purpose.

FRANCIS B. HALL.

Witnesses:
　W. W. Howe,
　C. W. Bangs.